United States Patent [19]
Guth et al.

[11] 3,919,402
[45] Nov. 11, 1975

[54] PETROLEUM OIL DESULFURIZATION PROCESS

[75] Inventors: Eugene Daniel Guth, Palos Verdes Peninsula; Norman L. Helgeson, Pasadena; Kenneth W. Arledge, Playa Del Rey; Anthony R. Brienza, Orange, all of Calif.

[73] Assignee: KVB, Inc., Tustin, Calif.

[22] Filed: Aug. 6, 1973

[21] Appl. No.: 385,895

[52] U.S. Cl. .................................. 423/522; 208/236
[51] Int. Cl.² .................... C01B 17/72; C10G 29/20
[58] Field of Search ........ 208/208 R, 219, 220, 221, 208/223, 236, 289, 254 R, 207; 423/522, 525, 528

[56]  References Cited
UNITED STATES PATENTS

| | | | |
|---|---|---|---|
| 508,479 | 11/1893 | Kayser | 208/289 |
| 522,028 | 6/1894 | Price | 208/220 |
| 1,933,748 | 11/1933 | Morrell | 208/236 |
| 2,009,898 | 7/1935 | Morrell | 208/289 |
| 2,027,464 | 1/1936 | Boulanger | 208/236 |
| 2,114,852 | 4/1938 | McKittrick | 208/208 R |
| 3,135,680 | 6/1964 | Fierce et al. | 208/236 |
| 3,244,618 | 4/1966 | Dimond et al. | 208/236 |
| 3,267,027 | 8/1966 | Fierce et al. | 208/236 |
| 3,847,800 | 11/1974 | Guth et al. | 208/236 |

FOREIGN PATENTS OR APPLICATIONS 603,081  6/1948  United Kingdom ................ 423/534

OTHER PUBLICATIONS

Riegel, E. R., Industrial Chemistry, 5th ed., 1949, Reinhold Publishing Co., New York, N.Y., pp. 26–27.
Fasullo, O. T., Sulfuric Acid, Use and Handling, 1965, McGraw-Hill, New York, N.Y., pp. 268–272, 286, 287, 289.

*Primary Examiner*—Oscar R. Vertiz
*Assistant Examiner*—Gary P. Straub
*Attorney, Agent, or Firm*—Stanley W. Sokoloff

[57] ABSTRACT

A method of the removal of sulfur from petroleum oils in which the sulfur in the oils is oxidized in part with an oxide of nitrogen to form gaseous sulfur compounds (e.g., $SO_2$, $SO_3$). The sulfur containing gas can then be further used by condensing and absorbing the sulfur trioxide in concentrated sulfuric acid. Water is then added to the resulting solution of $SO_3$ and concentrated sulfuric acid (oleum) to form additional sulfuric acid as a product. The remaining sulfur compounds in the oil may be simultaneously oxidized by a suitable oxide of nitrogen to form sulfoxides which, if desired, can be removed to further reduce the sulfur content by mixing the oxidized oil with a selective solvent, such as methanol, which is immiscible in the oil and in which the oxidized sulfur compounds will dissolve. Separation of the oil from the methanol-sulfur oxidized compound solution can be accomplished in a gravity separator or the like. The oxidizing gas is regenerated by the addition of oxygen in the feed gas or in the make-up gas and recirculated to oxidize further feeds of petroleum oils. If required, certain pretreatment steps may be used before oxidizing the oil to reduce polymerization and other side reactions such as cracking.

16 Claims, 1 Drawing Figure

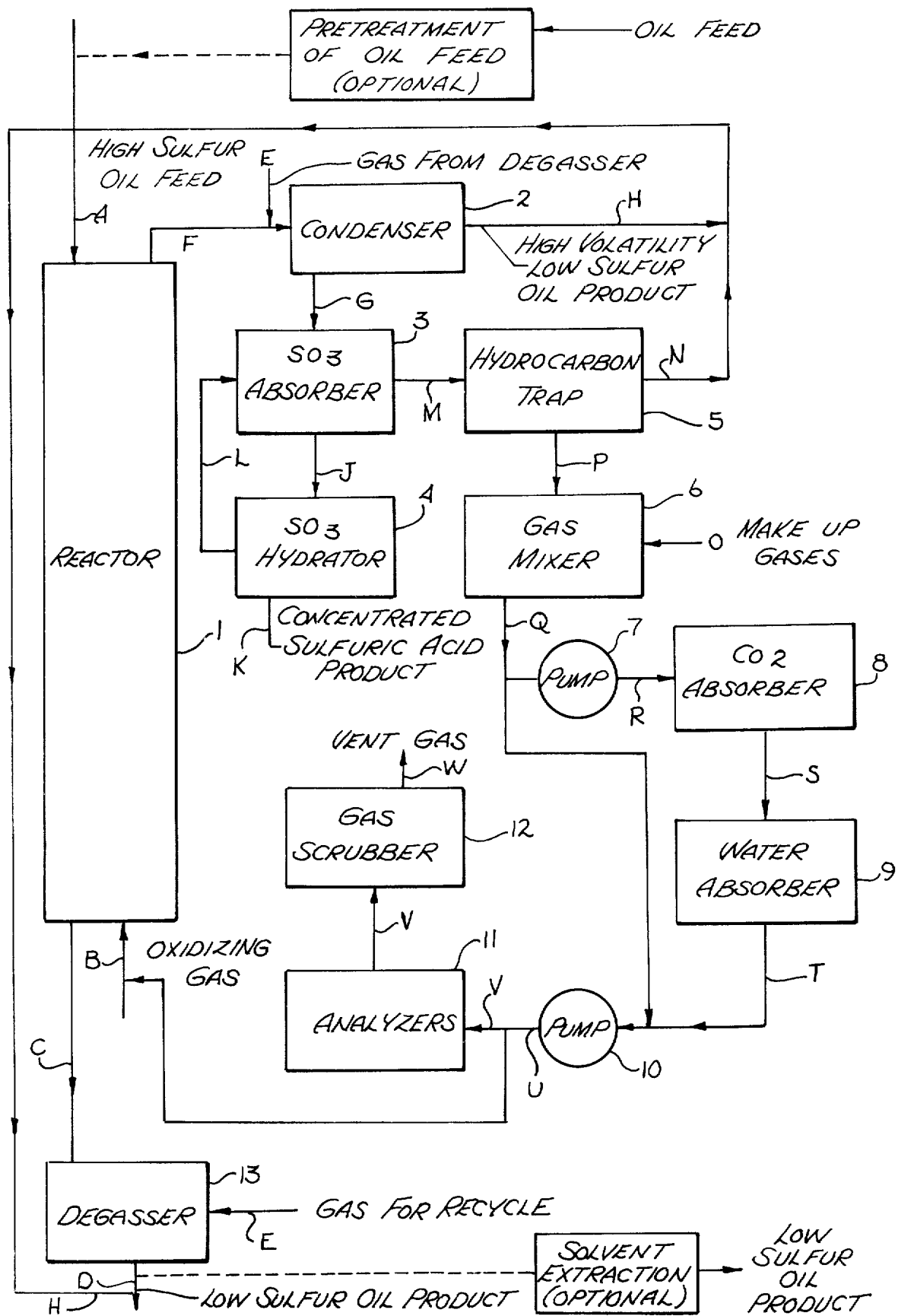

PETROLEUM OIL DESULFURIZATION PROCESS

BACKGROUND OF THE INVENTION

1. Field of the Invention

This invention relates to a method of removing unwanted sulfur from liquid petroleum oils by using a gaseous oxidizer and utilizing the sulfur oxides evolved to produce valuable by-products (such as concentrated sulfuric acid).

2. Prior Art

The presently used method for removing sulfur from hydrocarbon fuels involves the use of a high temperature-high pressure process to desulfurize hydrocarbon fuels using hydrogen, and an acid extraction process for the removal of basic nitrogen compounds. The old methods have major disadvantages. Hydrogen is a valuable material, made in refineries by pyrolyzing (hearing to decompose) hydrocarbon materials or through combustion to form carbon monoxide which is subsequently reacted catalytically with water at high temperature. In any case, it is costly to use hydrogen to remove sulfur (as hydrogen sulfide) from fuels. The reaction of hydrogen is nonselective in that some of the hydrogen will react with the oil to saturate hydrocarbon molecules (aromatics, olefins) in addition to the desired reaction forming hydrogen sulfide. This means that a large quantity of hydrogen is required to desulfurize hydrocarbon fuels.

A further disadvantage of the present method for sulfur removal is that it requires a heterogeneous catalyst. The furface of the solid catalyst tends to become fouled, particularly when residual oils are desulfurized, and this makes the old method inefficient or inoperable with some residual fuels.

A still further disadvantage of the present method for sulfur removal is that it requires high temperatures and high pressures for desulfurizing fuels. The reaction conditions make it necessary to use expensive equipment for the old process.

Several other methods of removing sulfur from hydrocarbons have been proposed in the prior art and are known to the applicant but these have not become commercially popular.

U.S. Pat. No. 1,968,842 issued to Malisoff proposes to treat the sulfur containing oil with a solution of an alkali in an organic solvent. The alkali reacts with mercaptans in the oil forming sulfur compounds which are more soluble in the solvent than in the oil. The Malisoff patent is directed specifically to sulfur in the form of mercaptans in the oil and does not deal in any way with the broad range of sulfur and nitrogen compounds susceptible to the method of the present invention.

U.S. Pat. No. 3,267,027 issued to Fierce discloses reacting light petroleum distillates with $NO_2$ followed by washing with an aqueous caustic and finally a water wash. The temperature of the reaction is limited to 35°C. This process also is directed primarily to the removal of mercaptans and thus also has limited applicability.

"Sweetening" of petroleum oils has also been known to applicant as having been proposed in several patents, and is a related process. While sweetening is not considered directly applicable, the applicant believes that the most pertinent of these in U.S. Pat. No. 3,244,618 which issued to Dimond. Again, the process considers only mercaptans and proposes to convert any mercaptans present in hydrocarbons to disulfides by reacting the mercaptans with oxygen in the presence of an oxide of nitrogen. The resulting disulfides are not as odorous as the mercaptans and thus the treated oil is considered sweet.

While in concept the old methods can be used to desulfurize fuels they lead to large economic penalties. In some cases the cost of desulfurizing may exceed the cost of the fuel.

With respect to the prior art dealing with removing sulfur from an oil stream to form sulfuric acid, U.S. Pat. No. 1,018,040 (Eggleston) and U.S. Pat. No. 1,018,374 (Robinson) generally disclose processes for obtaining sulfuric acid by passing "Beaumont oil" containing sulfur through a still at a temperature sufficient to evolve a rich hydrogen sulfide gas (e.g. 300–500°F.) separating the oil vapors by condensation, buring the hydrogen sulfide gas to form sulfur dioxide and then converting the sulfur dioxide into sulfuric acid by oxidation in "lead chambers" or in a "contact apparatus".

These latter patents teach processes which require a fuel such as Beaumont oil which will give off a rich stream of $H_2S$ at distillation temperatures and is not applicable to a wide range of petroleum oils. Further, these prior art processes require a number of steps and extensive equipment in order to oxidize and convert the hydrogen sulfide to sulfur dioxide and sulfur trioxide to accomplish the making of sulfuric acid. Also, the light hydrocarbons given off at the distillation temperatures have to be removed or separated to prevent carbon monoxide and carbon dioxide from being formed before making sulfuric acid.

The processes discussed in U.S. Pat. Nos. 1,018,040 and 1,018,374 involve the removal of sulfur by evolving hydrogen sulfide gas at distillation temperatures. The percentage of sulfur present in petroleum oils that can be converted into hydrogen sulfide by heating the oil is substantially less than the amount of sulfur which can be removed by oxidizing the sulfur in the oil with a suitable oxidizing gas (e.g. oxide of nitrogen) since more sulfur is generally present in the oxidized gaseous products and the oxidized sulfur compounds in the liquid oil stream, such as, sulfoxides can be selectively removed by a suitable extraction with methanol or another appropriate solvent as will be discussed more fully hereinafter.

None of the known prior art processes remove substantial amounts of sulfur from various types and grades of petroleum oil by oxidizing the oil with oxides of nitrogen to form gaseous sulfur trioxide ($SO_3$) which then can be directly and economically used to produce concentrated sulfuric acid as a valuable by-product while economically producing a low sulfur oil.

While in concept the old methods can be used to desulfurize they lead to large economic penalties or yield only minimal sulfur reduction. In some cases the cost of desulfurizing may exceed the cost of the fuel. Further, the known processes for producing sulfuric acid by utilizing the sulfur in petroleum oils is limited to certain grades of oil, is not economical and results in only minor sulfur removal.

A low cost simple method of removing sulfur from petroleum fuels is mandatory if current and projected air pollution regulations are to be met. Accordingly, the general purpose of the present invention is to provide such a low cost process. The invented process is low cost since it is carried out at low pressures and temperatures, that is, the process equipment is inexpensive compared to the equipment required for high pressure, high temperature processes. Further, the process uses mostly low cost chemicals (i.e., oxygen, nitrogen oxides and methanol, if solvent extraction is used, the latter two being recycled) to remove substantially all of the sulfur from the fuels. Further concentrated sulfuric acid can be produced as a valuable by-product by treating the gas stream to selectively absorb the $SO_3$ in concentrated $H_2SO_4$ and hydrating the $H_2SO_4$ and $SO_3$ mixture (oleum) to form additional concentrated sulfuric acid from the absorbed $SO_3$.

SUMMARY OF THE INVENTION

The present invention involves the selective oxidation of sulfur compounds in liquid phase petroleum oil. The term "petroleum oil" as used herein shall mean diesel oil, gasoline, jet fuel, furnance oil, residual oil, crude oil, topped crude oil and similar hydrocarbon mixtures. Nitrogen oxides, such as $NO_2$, $N_2O_3$, $N_2O_4$ and $N_2O_5$, may be used to oxidize the sulfur in the oil stream. Oxygen is used to produce nitrogen dioxide ($NO_2$) from the NO formed by the reaction of the oxides of nitrogen and the petroleum oil and the $NO_2$ is then recycled. The oxygen can be fed to the reactor along with the oxidizing gas stream or added to the recycle stream to regenerate the oxidizers before the gas enters the reactor. Nitrogen dioxide ($NO_2$) is the preferred oxide of nitrogen for the present process since the other oxides mentioned in effct form $NO_2$ during the oxidation step. If NO is used it must be used with oxygen or air to form $NO_2$.

The oxidation preferably occurs in a reactor vessel which is packed with a suitable material such as Pall rings or Berl saddles and which is designed to allow the oxidizing gas to pass upwardly through the reactor while liquid phase petroleum feed oil is passed downwardly so as to cause intimate contact between the stream of oxidizing gas and the petroleum oil stream. The reactor should be designed to allow sufficient contact between the two streams with a minimum amount of pressure drop. If necessary, the petroleum oil feed may be pretreated (e.g., thermally soaked) to adjust the volability or viscosity of the oil and to prevent polymerization and cracking which makes the oil easier to handle in the process. Also, the active groups in the oil may be removed by pretreating the oil with a reactant such as water, hydrogen or ammonia.

After the oxidation the gas stream at the top of the reactor typically contains about 0.05 to 1% volume of $SO_3$ gas which is preferably selectively absorbed and used to produce concentrated sulfuric acid. The overall reaction taking place is believed to be as follows: $R_1SR_2 + 3NO_2 \rightarrow R_1 + R_2 + SO_3 + 3NO$ where $R_1$ and $R_2$ are aliphatic or aromatic hydrocarbon components. The detailed mechanisms of the reaction are not fully understood at this time. The gas may also contain other oxidized sulfur containing compounds such as sulfur dioxide ($SO_2$), carbonyl sulfide (COS), etc., which can be reacted to sulfur trioxide at this point or recycled to form sulfur trioxide in the reactor. The oxidation also results in the formation of sulfoxides, sulfonic acids and other oxygen containing sulfur compounds in the oil stream which can be selectively dissolved and extracted in a suitable solvent, such as methanol, to separate the oxidized sulfur compounds from the oil. A suitable solvent is one which will selectively dissolve the oxidized sulfur compounds yet be immisible with the oil for easy separation. The solvent containing the sulfur compounds and a fraction of dissolved oil can be separated from its solute either by evaporating the solvent or cooling the mixture to a temperature at which the oxidized sulfur compounds have a low solubility. The solvent can then be recycled through the process. The sulfur may then be removed from the solute, for example, by hydrolysis or pyrolysis.

The present invention provides a highly desirable solution to the ecological problems normally associated with the use of high sulfur fuel oils and will aid in solving the fuel shortage problem by upgrading fuels which cannot presently be used because of excessive sulfur content. In its simplest form the present process can result in one step sulfur removal from petroleum oils.

The ability to produce concentrated sulfuric acid further enchances the economics of the process since concentrated sulfuric acid is the highest value form of sulfur which is needed by industry. The credit obtained from the co-production of the concentrated sulfuric acid greatly reduces the overall cost of the process.

The invented process involves no solid waste disposal problems. Also, there is virtually complete hydrocarbon recovery.

The invented process can be used on a wide range of petroleum oils, even very high sulfur feed oils (e.g., 5–10% sulfur) because virtually no oil is lost with the sulfur.

The advantages and features of the present invention will be further apparent in light of the drawing and detailed description contained hereinbelow.

BRIEF DESCRIPTION OF THE DRAWING

The drawing shows a schematic block diagram of the invented process for desulfurizing petroleum oils, including the utilization of the sulfur trioxide evolved to produce sulfuric acid as a by-product.

DETAILED DESCRIPTION OF THE INVENTION

As previously described, the present invention is designed to desulfurize petroleum oils by oxidizing the feed stream into suitable oxides of nitrogen to form gaseous $SO_3$. If desired, the sulfoxides formed in the oil can then be solvent extracted. The $SO_3$ can be used to form valuable by-products. Presently, the most valuable by-product is considered to be concentrated sulfuric acid and the process for doing so will be described in detail below. However, it should be understood that the $SO_3$ could also be utilized to form other commercially needed sulfates such as $CaSO_4$, $Na_2SO_4$, $MgSO_4$, $FeSO_4$ and $(NH_4)_2SO_4$. In making the latter types of inorganic sulfates, sulfuric acid produced by the invented process can be neutralized with appropriate hydroxides (e.g., NaOH) or oxides (e.g., CaO) to form the desired sulfates. However, the sulfur trioxide can also be directly reacted with the appropriate hydroxides and oxides to form the desired sulfates.

The present invention which involves the oxidation of sulfur in liquid phase fuel oils with a gas phase oxidizer results in the removal of sulfur from the oils without regard to the mercaptan content. The efficient removal of sulfur which occurs requires higher than catalytic concentration of nitrogen oxides and certain ranges of temperatures, pressures and flow rates. The invented process is capable of removing sulfur, even from mercaptan free oils.

A preferred continuous form of the process is shown in the drawing and will now be described in detail. While a batch process is possible it would generally be impractical and uneconomical. The process in the drawing shows the pretreatment and extraction steps which may be desired and which will be described hereinafter. It has been assumed in the drawing that such pretreatment steps either have been performed or are not required for the particular feed oil being processed.

The high sulfur petroleum oil feed A is pumped into the top of reactor 1 and oxidizing gas B is fed into the bottom of the reactor 1. The reactor 1 is a stainless steel vessel or tube packed with Pall rings, Berl Saddles or a similar packing which will provide a large area for contacting the oil feed A with the oxidizing gas B. The oil feed A flows in thin layers so that a large surface of oil is presented for contact by the oxidizing gas. A typical reactor 1 may be packed with Berl saddles which occupy about 50% of the reactor volume leaving sufficient open space through which the oxidizing gas can pass and contact the oil on the surface of the saddles. Other types of reactors, such as agitated vessels could also be used to provide the contact required.

The oil feed A may constitute any known type of petroleum oils (e.g., diesel fuel, residual oil or topped crude) having undesired amounts of sulfur which must be removed or decreased substantially. As can be observed from Table I substantial sulfur removal has been obtained using the invented process with various petroleum oil feeds.

The oxidizing gas B is comprised of oxides of nitrogen and may constitute a single oxide or a mixture of nitrogen oxides. The oxides which can be used are $NO_2$, $N_2O_3$, $N_2O_4$ and $N_2O_5$ as previously discussed hereinabove.

Depending on the sulfur content, the physical properties of the feed oil A and the desired degree of sulfur removal, the reaction conditions for oxidation generally are within the following ranges:

Pressure — 0.5 to 50 atmospheres
Temperature — 50° to 350°F
Time — 10 to about 1500 minutes
Oil Flow Rate — 0.5 to 25 gals/min/sq.ft. of reactor area
Gas Composition — 1 to 30 vol % oxygen
Gas Composition — 0.5 to 15 vol % nitrogen oxides
Gas Flow Rate — 1 to 125 lbs/min/sq.ft. of reactor area It has been found that 10 minutes to about 60 minutes quite often is sufficient time for obtaining the desired reaction. Also, excellent results have been obtained operating the invented process with the reactor at atmospheric pressure. However, the pressure selected will depend on the reactor design and the desired time for the reaction. Also, higher pressure tends to decrease the volume percentage of nitrogen oxides and oxygen required in the oxidizing gas to achieve the desired oxidation. The time-temperature relationship is one whereby the liquid phase oil remains in the reactor a sufficient time to substantially oxidize the sulfur in the oil to gaseous sulfur compounds including $SO_3$ at a temperature which does not cause polymerization and other undesired side reactions in the oil, such as cracking. The viscosity, volatility and type of oil treated are important factors in determining the temperature desired. For example, diesel fuels can be treated at about 50°–80°F., most residual oils in the range of about 150° to 250°F and a pitch at about 350°F. To provide suitable feed stocks for our process, the viscosity of the oil can be lowered by blending with suitable stocks and the volatility can be decreased by removing low boiling hydrocarbon fractions using techniques known to those skilled in the art. In general, reaction at a low temperature is preferred as long as the viscosity of feed or blended feed is not sufficiently high to prevent satisfactory flow through the reactor. The gas flow rate is maintained proportional to the oil flow rate during oxidation to achieve the desired stoichiometry and a higher gas flow rate is required for oil feeds with higher sulfur content.

A potential problem exists if undiluted oxidizing gas is used because a possible explosive mixture with the petroleum vapors may be formed within the reactor. To prevent this, it is preferable to dilute the oxidizing agent with some relatively inert gas such as nitrogen. While nitrogen is the preferred inert gas since it is readily available and low cost, other inert gases such as argon and/or mixtures of nitrogen and CO, $CO_2$ or water vapor. Typically, the gas used is 2 to 20 volume percent oxidizer, the balance being inert or partly oxygen and partly inert. Presently, preferred compositions of oxidizing gases being used comprise about 1 to 9% by volume NO, 1 to 9% by volume $NO_2$, 1 to 19% by volume $O_2$ with the balance $N_2$.

After the oxidation reaction takes place in the reactor 1, low sulfur oil C flows from the reactor to a degasser 13 to remove any dissolved oxidizing gases E thereby forming the final low sulfur oil product D.

The oxidizing gases E removed from the degasser 13 can then be added to the gases F which are given off at the top of reactor 1.

The gases F from the reactor 1 and the gases E from degasser 13 are then preferably treated in a series of steps prior to recycling.

The gases E and F are fed into a standard or conventional condenser 2 in which hydrocarbon compounds volatilized during the oxidation step are condensed by cooling the gases to 50° to 100°F. In general, about 1 to 5%, by weight, of the oil fed into the reactor which volatilizes comes from hydrocarbon molecules which split when the sulfur is removed. Prior to reaction feed oils would be fractionated so they do not contain any significant fraction of compounds which volatalize in the range of reaction conditions stated above.

After the hydrocarbons have been condensed the gas stream G is fed into an $SO_3$ absorber 3 which selectively removes the $SO_3$ formed during the oxidation reaction from the rest of the gas stream. A substantial portion of the sulfur in the gas stream is sulfur trioxide. Any sulfur dioxide or other gaseous sulfur compounds (such as carbonyl sulfide) can be reacted in the oxidizing gas prior to the sulfur trioxide removal to form additional sulfur trioxide simply by heating the gas stream to 300° to 400°F for several minutes. Alternatively, the gaseous sulfur compounds including sulfur dioxide can be recycled to the reactor until they are converted to sulfur trioxide. Both alternatives are within the scope of our invention; however, only the latter alternative is discussed in detail herein. Concentrated $H_2SO_4$ is a suitable absorbing fluid and the resulting absorption produces a solution J of concentrated $H_2SO_4$ and $SO_3$ (oleum). The hydrocarbons H removed in the condenser 2 are then combined with the low sulfur oil product D coming out of the degasser 13.

The oleum J is then passed into a $SO_3$ hydrator 4 where water is added to form additional $H_2SO_4$ from the $SO_3$ which was absorbed in the concentrated $H_2SO_4$. The additional concentrated $H_2SO_4$ product K is then removed as a valuable by-product of the invented process.

The remaining concentrated $H_2SO_4$ L is returned from the hydrator 4 to the absorber 3 to further absorb $SO_3$ from the gas stream G.

As an alternative to the sulfur trioxide absorption in sulfuric acid and also within the scope of our invention, the sulfur trioxide could also be absorbed by or reacted directly with a basic oxide or hydroxide such as calcium oxide or sodium hydroxide to form a sulfate such as calcium sulfate or sodium sulfate.

The remaining portion M of the gases from the reactor are passed through a hydrocarbon trap 5 in order to reduce further the hydrocarbon content of the gas to less than about 0.1% by volume. The hydrocarbons N removed in the trap 5 are then mixed with the high volatility low sulfur oil product H from the condenser 2 and the low sulfur oil product D coming from the degasser 13. The hydrocarbon trap is typically a water cooled cylinder with baffles disposed therein.

A stream O of make-up oxygen, nitrogen oxides (e.g., $NO_2$, $N_2O_3$, $N_2O_4$ and/or $N_2O_5$) and nitrogen is added to bring the gas stream P coming from the hydrocarbon trap 5 back to the desired oxidizing gas composition.

A gas mixer 6 (e.g., a plurality of baffles) is normally employed to make the mixture of gases O and P homogeneous. The homogeneous gas having the desired feed composition leaves the gas mixer as stream Q.

A slip stream R (e.g., about 0.1 to 2% of the total) is pumped by pump 7 through a $CO_2$ absorber 8 to remove $CO_2$ and the resulting gas S is then fed into a water absorber 9 to remove water from the gas. The oxidizing gas B should ideally contain low concentrations of $CO_2$ and water and thus absorbers 8 and 9 prevent an excess accumulation of $CO_2$ and water. While $CO_2$ and water are essentially inert in the present process, they should be removed or vented to prevent build-up in the composition of the oxidizing gas.

The gas T coming from the water absorber 9 is then combined with the gas stream Q and the resulting gas mixture U is pumped by pump 10 back into the reactor for use as the oxidizing gas.

A portion V of the gas stream U (about 0.001 to 0.10% by volume) is fed into a gas analyzer 11 in order to measure the concentration of oxygen, water, CO, $CO_2$, NO, $NO_2$, $SO_2$ and $SO_3$, nitrogen and hydrocarbons in the gas stream U. The analyzer 11 thus indicates whether the process is operating within the desired predetermined parameters and whether the desired oxidizing gas compositions (particularly oxygen) are being maintained at the desired levels so that the make-up gas O (i.e., nitrogen oxide, $O_2$ and $N_2$) can be properly controlled. If required, a gas scrubber 12 can be used to remove undesired air pollutants, such as $NO_2$, NO, $SO_2$ and CO, before venting the gas W into the atmosphere. If desired, the gases being analyzed could be returned to the gas stream U and the system vented at another suitable place.

During the invented process additional nitrogen may be formed by the reaction of NO and the various hydrocarbon present, i.e., NO + hydrocarbon → $\frac{1}{2}N_2$ + $H_2O$ + hydrocarbon. Thus, nitrogen may have to removed or vented in order to maintain the desired composition of the oxidizing gas.

It should be understood that the reactor 1 may be operated in one of several modes to carry out the desired oxidation. For example, it may be desirable to make oxidizing gas additions at various heights in the reactor 1. Also, the oil stream from the reactor may be recycled or looped through the reactor 1 with continuous withdrawl of a fraction of the oil as product and the remainder as an appropriate feed make up to reduce the percentage of sulfur in the petroleum oil feeds and provide a higher velocity through the reactor.

Some examples showing the results obtained with the invented process for various types of petroleum oil are shown in Table 1 below. Table 1 indicates results obtained in a 1/15 square foot reactor using 9 volume % $NO_2$ and 91 volume % air.

TABLE I

OIL DESULFURIZATION TESTS

| Oil | $NO_2$ Temp °F | Oxidizing Gas Feed Vol % NO* in Air | Reaction Conditions Pressure Atms | Total Gas Flow Cu.ft/min. | Oil Flow gals/hr | Reaction Time Hours | Weight % S Remaining in the oil | Remarks |
|---|---|---|---|---|---|---|---|---|
| Alaskan Topped North Slope Crude | 150 | 9 | 1 | .15 | 2 | 0<br>.6<br>1.2<br>1.8<br>2.4<br>3.3 | 1.40<br>1.08<br>0.82<br>0.68<br>0.53<br>0.40 | The crude had 1.0 % sulfur. The crude was topped at 450°F. The light ends (30% of the crude) had 0.1% sulfur. |
| East Coast No. 6 Fuel Oil | 150 | 9 | 1 | .15 | 2 | 0<br>0.5<br>0.9<br>1.4<br>1.8 | 0.25<br>0.19<br>0.16<br>0.16<br>0.13 | |
| Cook Inlet Alaskan Residual Oil | 150 | 9 | 1 | .15 | 2 | 0<br>.3<br>.6<br>1.0 | 0.22<br>0.16<br>0.14<br>0.11 | |
| High Sulfur California Residual Oil | 250 | 9 | 1 | .15 | 2 | 0<br>.3<br>.6<br>1.0 | 2.15<br>—<br>1.67<br>1.38 | |
| California Wilmington Topped Crude | 150 | 9 | 1 | .15 | 2 | 0<br>.3 | 1.70<br>1.50 | The crude had 1.33% sulfur. The crude was topped at 450°F. The light ends (25% of the crude) had 0.2% sulfur. |

*NO in Air mixture was reacted to equilibrium (substantially all the NO was present as $NO_2$ in the gas) prior to being fed to the reactor.

As previously discussed, some form of oil pretreatment may be desired. For example, a thermal soak at 450°F for up to 6 hours is usually desirable for most oils and makes the oil easier to handle by causing the reactive group (e.g., constituents such as olefins and the like) in the oil to combine with parts of other hydrocarbon molecules, thus making such groups less active and reducing harmful side reactions during the oxidation such as polymerization and coking. As a backup to the thermal soak, the fraction of the oil which tends to polymerize or coke can be filtered out of the oil at selected points in the reactor during oxidation to avoid fouling the reactor. Changing the viscosity of the feed oil and its volatility prior to reaction may be desirable in some cases.

Other pretreatments that can be used involve using a reactant such as water, hydrogen or ammonia to react with the active groups (e.g., constituents such as olefins and the like) in the feed oil thus reducing the amount of such active materials in the oil.

Feed oils having a high volatility fraction (e.g., compounds having more than about 5% of a fraction with a boiling point below 400°F) can be pretreated by topping. This is accomplished by heating the feed oil to temperatures up to about 800°F at atmospheric pressure or 1000°F in vacuum. The high volatility portion is usually low in sulfur content and thus the removal of such high volatility portion increases the overall efficiency of the process. A feed oil which contains a substantial methanol soluble portion can be pretreated with methanol or a methanol-water solution to first separate such soluble portion. In addition to methanol aqueous mixtures of methanol and 1 to 20 volume % water have been found to be quite effective. The amount of water and methanol can be varied depending on the specific feed oil being used to achieve the best results. Pretreatment of the feed oils should be made only to the extent necessary to make the oils handleable in the process. The exact pretreatment steps will depend on the sulfur content, physical properties and sulfur removal required of the oil feed.

As previously described above, during the oxidation reaction in the reactor 1, sulfoxides and sulfonic acids are normally produced at the operating conditions required to obtain the gaseous $SO_3$. As described in detail in the co-pending application of Guth et al. (Ser. No. 385,894) entitled "Method for Removing Sulfur and Nitrogen in Petroleum Oils" filed Aug. 6, 1973 now U.S. Pat. No. 3,847,800 extraction of sulfoxides and sulfonic acids can be accomplished by mixing the oxidized oil with a solvent which will dissolve the sulfoxides and sulfonic acids and which can be easily separated from the oil. For example, a suitable solvent has been found to be methanol or an aqueous methanol solution containing about 1–20 volume % water. Methanol will readily dissolve the sulfoxides formed during oxidation and since methanol is substantially immiscible with petroleum oil it can be readily separated in a gravity separator or by decantation. The details of the extraction process described in the above mentioned co-pending application are incorporated herein by this reference and such process can be used as an adjunct to the invented process described herein.

To illustrate the use of the oxidation and extraction steps in sequence, the following example is presented. A sample of Cook Inlet Alaskan crude oil was oxidized in a continuous flow reactor at 150°F using a gas flow of 4 liters/min (3.6 liters/min of air plus 0.4 liters per minute of nitrogen dioxide. The total residence time of oil in the reactor was about 20 minutes. Initially the oil contained 0.16 weight percent sulfur. After oxidation, the oil contained 0.13 weight percent sulfur. The oxidized oil was then contacted with an equal volume of methanol at 150°F for 10 minutes with rapid stirring. The oil layer and methanol layer were then separated and the oil heated to 250°F to drive off any methanol remaining in the oil. The oxidized and extracted oil had 0.08 weight percent sulfur.

One of the potential advantages which could be achieved by combining the solvent extraction of sulfoxides from the oil with the removal of sulfur as gaseous $SO_3$ is a reduction of time in the reactor to obtain the desired sulfur removal. For example, it could be more economical at some point in the above-described process to solvent extract the sulfoxides rather than keep the oil in the reactor longer times to remove the sulfur mostly in the form of $SO_3$. In applying the present invention such an approach should be considered in order to optimize the economics.

While the preferred version of the invented process has been described in great detail, it should be understood that the invention is not so limited. Various changes or modifications apparent to those skilled in the art can be made without departing from the spirit and scope of the present invention.

We claim:

1. A method of removing sulfur from liquid petroleum oil which has been fractionated to remove components which volatalize at the operating temperatures of said method, comprising the steps of:
   a. oxidizing the sulfur compounds in said liquid petroleum oil at a temperature of about 50° to 350°F with an oxidizing gas containing (i) a total of about 0.5 to 15% volume % of one or more of the oxides of nitrogen selected from the group consisting of $NO_2$, $N_2O_3$, $N_2O_4$ and $N_2O_5$; (ii) about 1–30 volume % of oxygen and (iii) a remaining volume % of a gas which is inert in the oxidation and serves as a diluent to prevent the formation of an explosive mixture, to directly form gaseous sulfur oxide compounds including gaseous $SO_3$ as a constituent in the gas produced, thereby reducing the sulfur content of said petroleum oil; and
   b. treating said $SO_3$ gas to produce concentrated sulfuric acid.

2. The method of claim 1 in which after treating said $SO_3$ gas to form sulfuric acid a remaining portion of said gas produced is mixed with a make-up gas containing oxygen and recycled to serve said oxidizing gas.

3. The method of claim 1 in which said petroleum oil is pretreated prior to oxidation by thermal soaking the oil at a temperature of about 450°F for up to 6 hours, to minimize unwanted side reactions during oxidation.

4. The method of claim 1 in which said petroleum oil is pretreated by reacting any active groups in said petroleum oil with a reactant selected from the group consisting of water, hydrogen and ammonia to reduce such active groups prior to oxidation.

5. The method of claim 1 in which said petroleum oil is pretreated prior to oxidation by topping said petroleum oil by heating said petroleum oil at temperatures up to 800°F at atmospheric pressure.

6. The method of claim 1 in which said petroleum oil is pretreated prior to oxidation by heating said petroleum oil at temperatures up to 1000°F in a vacuum.

7. The method of claim 1 in which said oxidation takes place in a packed tower reactor and said liquid petroleum oil is fed into said reactor at a rate of about 0.5 to 25 gals/min/sq.ft. of reactor area; and said oxidizing gas is fed into said reactor at a flow rate of about 1 to 125 lbs/min/sq.ft. of reactor area.

8. The method of claim 1 in which during the oxidation of said liquid petroleum oil sulfoxides and sulfonic acids are formed in said petroleum oil.

9. The method of claim 1 in which said inert gas is nitrogen.

10. The method of claim 1 in which the oxidation occurs at a pressure of about 0.5 to 50 atmospheres.

11. The method of claim 1 in which the liquid petroleum oil is oxidized for a time period of about 10 to 1500 minutes.

12. The method of claim 1 in which said inert gas comprises a gas selected from the group consisting of nitrogen, argon, CO, $CO_2$, water vapor and mixtures thereof.

13. The method of claim 1 in which $NO_2$ is present and at least part of the $NO_2$ used is formed by the reaction of NO and oxygen.

14. The method of claim 13 in which said oxidizing gas contains about 1–9% NO, about 1–9% $NO_2$, about 1–19% $O_2$ and said inert gas is nitrogen.

15. The method of claim 1 wherein step (b) is performed by absorbing said $SO_3$ gas in sulfuric acid.

16. The method of claim 15 wherein said concentrated sulfuric acid is diluted with water and is withdrawn as required.

* * * * *